United States Patent [19]

Falck

[11] Patent Number: 5,029,472
[45] Date of Patent: Jul. 9, 1991

[54] MEASURING INSTRUMENT, PREFERABLY FOR WATERCRAFT

[75] Inventor: Frans G. Falck, Torslanda, Sweden

[73] Assignee: AB Volvo Penta, Gothenburg, Sweden

[21] Appl. No.: 424,257

[22] PCT Filed: Apr. 13, 1988

[86] PCT No.: PCT/SE88/00190
§ 371 Date: Nov. 9, 1989
§ 102(e) Date: Nov. 9, 1989

[87] PCT Pub. No.: WO88/08187
PCT Pub. Date: Oct. 20, 1988

[30] Foreign Application Priority Data

Apr. 14, 1987 [SE] Sweden ............................. 8701559

[51] Int. Cl.⁵ ................................................ G01D 11/26
[52] U.S. Cl. ............................ 73/431; D10/102; 116/305; 324/156
[58] Field of Search ............... 73/431, 866.3; 116/305; 324/156; D10/102; 340/691, 693; 374/194, 208, 209

[56] References Cited

U.S. PATENT DOCUMENTS

| D. 58,530 | 8/1921 | Anibal | D10/102 X |
|---|---|---|---|
| D. 126,076 | 3/1941 | Kimes | D10/102 X |
| D. 160,699 | 10/1950 | Fischer | D10/102 X |
| 2,285,658 | 6/1942 | Hitchcock | 73/431 |
| 2,374,800 | 5/1945 | Bohlke | 324/156 X |
| 2,535,484 | 12/1950 | Conroy | 116/305 X |
| 3,530,723 | 9/1970 | Hogue et al. | 73/431 |
| 3,543,586 | 12/1970 | Weite | 73/431 |
| 3,630,089 | 12/1971 | Bissell | 73/431 |
| 4,350,654 | 9/1982 | Yoshida | 264/129 |
| 4,409,827 | 10/1983 | Overs | 73/181 |

FOREIGN PATENT DOCUMENTS

| 0225694 | 6/1987 | European Pat. Off. | |
| 2225264 | 12/1973 | Fed. Rep. of Germany . | |
| 2949863 | 6/1981 | Fed. Rep. of Germany | 73/431 |
| 3036840 | 4/1982 | Fed. Rep. of Germany . | |
| 2260847 | 9/1975 | France | 73/431 |
| 173414 | 9/1985 | Japan | 73/431 |
| 383932 | 4/1976 | Sweden . | |
| 416248 | 12/1980 | Sweden . | |
| 599581 | 3/1948 | United Kingdom | 324/156 |

OTHER PUBLICATIONS

"Electrical Indicating Panel Meters and Pyrometers", Bulletin. G-9, Feb. 1955; API (Assembly Products, Inc.) of Chesterland, Ohio, pp. 1-8.

Primary Examiner—Tom Noland
Attorney, Agent, or Firm—Young & Thompson

[57] ABSTRACT

A measuring instrument comprising an instrument body (1), a dial (2), an attachment plate (3) on the instrument body behind the dial, and a transparent front plate (4) covering the dial. The front plate is permanently and water-tightly attached to at least one of the attachment plate and dial and defines a sealed space between the front plate and the dial. A separate detachable decoration panel (11) covers part of the front plate and has a U-shaped cross section having legs that have profiled resilient parts. The front plate and attachment plate have corresponding profiled parts (14, 15) which coact with the profiled panel parts to enable the decoration panel to be snap-fitted onto the instrument with its legs gripping between them the front plate and the attachment plate.

2 Claims, 2 Drawing Sheets

MEASURING INSTRUMENT, PREFERABLY FOR WATERCRAFT

FIELD OF THE INVENTION

The present invention relates to a measuring instrument, preferably for watercraft, e.g. for indicating fuel volume, voltage, oil pressure and the like, comprising an instrument body, an indicator dial and a tranparent front plate which covers the indicator dial.

BACKGROUND OF THE INVENTION

With watercraft instruments of this kind it is known to attach the transparent front instrument glass to the instrument body with the aid of a frame, provided with a bayonet-fitting which coacts with the instrument body. The frame serves as an attachment means and also as a decoration and one and the same instrument can be provided with different frames for fitting the instrument to different installations, e.g. different types of engine. When necessary, one type of frame can be exchanged for another, e.g. if the instrument is moved to another panel.

It must be possible to fit certain types of watercraft instruments, or gauges, into an open recess in a watercraft, which means that the instrument must be watertight and consequently that there must be a close fit between frame, glass and instrument body. Furthermore, a great deal of accuracy is required when fitting the parts together. If the parts are not fitted together correctly it is possible that moisture will penetrate into the instrument and damage the same.

OBJECTION OF THE INVENTION

The object of the present invention is to provide an instrument, or gauge, of the aforesaid kind which can be made completely watertight and which can nevertheless be "tailor made" to some extent with regard to its aesthetic appearance, e.g. so as to conform with the engine installation for which the instrument is intended.

SUMMARY OF THE INVENTION

This object is achieved in accordance with the invention in that the transparent front plate is permanently fixed to the instrument body and/or the dial, and in that a separate decoration strip/decoration panel covers a part of the front plate.

For example, an instrument manufacturer is able to deliver instruments of a basic design to different engine manufacturers and supply decoration strips or panels which bear the name or trade mark of the various engine manufacturers, so that each engine manufacturer or engine installation contractor is able to place, e.g., his name on the instrument, simply by snap-fitting his personal decoration strip onto the transparent front plate of the instrument. It is also possible to supply a variety of decoration strips or panels directly to the customer, so as to enable different tastes, with regard to the aestethic appearance of the instrument instrument installation, to be satisfied to a greater extent than was previously possible.

BRIEF DESCRIPTION OF THE DRAWINGS

The invention will now be described in more detail with reference to an exemplifying embodiment thereof illustrated in the accompanying drawing, in which.

DETAILED DESCRIPTION OF THE INVENTION

The illustrated instrument, or gauge, may be a moving coil instrument for indicating fuel volume, voltage, amperage, oil pressure, water coolant temperature or the like, and includes a cylindrical instrument casing or body 1 which houses a moving coil and associated electrical components.

Figure 3:
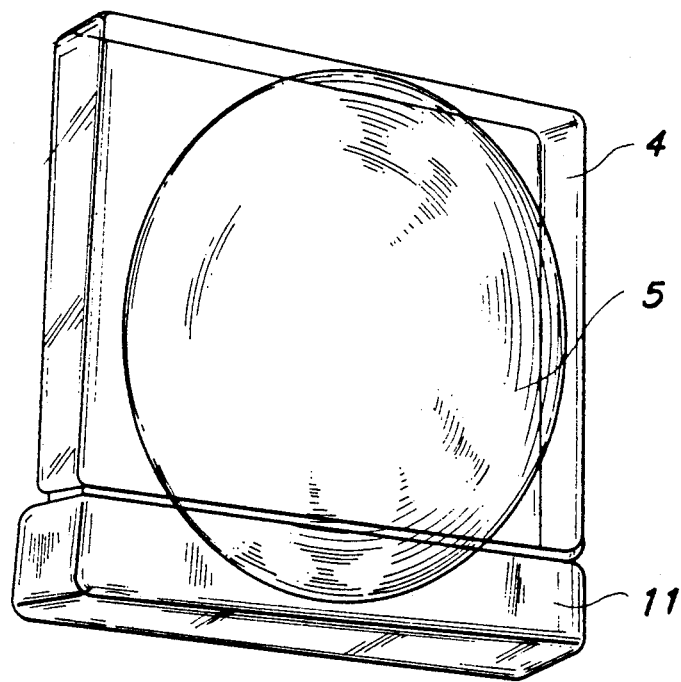
FIG. 3 is a perspective view of a front plate with a decoration strip attached thereon.

A dial 2 is attached to an attachment plate 3 on the instrument casing 1 and is covered by a transparent front plate 4. The plate 3, the dial 2 and the front plate 4 of the illustrated embodiment are square in shape and the front plate 4 has a centrally located circular part 5 which has a spherically cupped surface in the otherwise flat surface thereof (of FIG. 3).

The front plate 4 suitably comprises a plastics material and is glued or welded permanently to the attachment plate 3 and/or the rim of the dial 2, so as to obtain a completely watertight join at 6, in order to prevent the ingress of moisture into the space 7 between the dial 2 and the front plate 4, i.e. the "instrument glass".

The instrument is intended to be fitted into a circular aperture in an instrument panel, with the aid of a U-shaped bracket structure 8 and two nuts 9 which are screwed into two screws 10 firmly connected to the body of the instrument.

Figure 1:
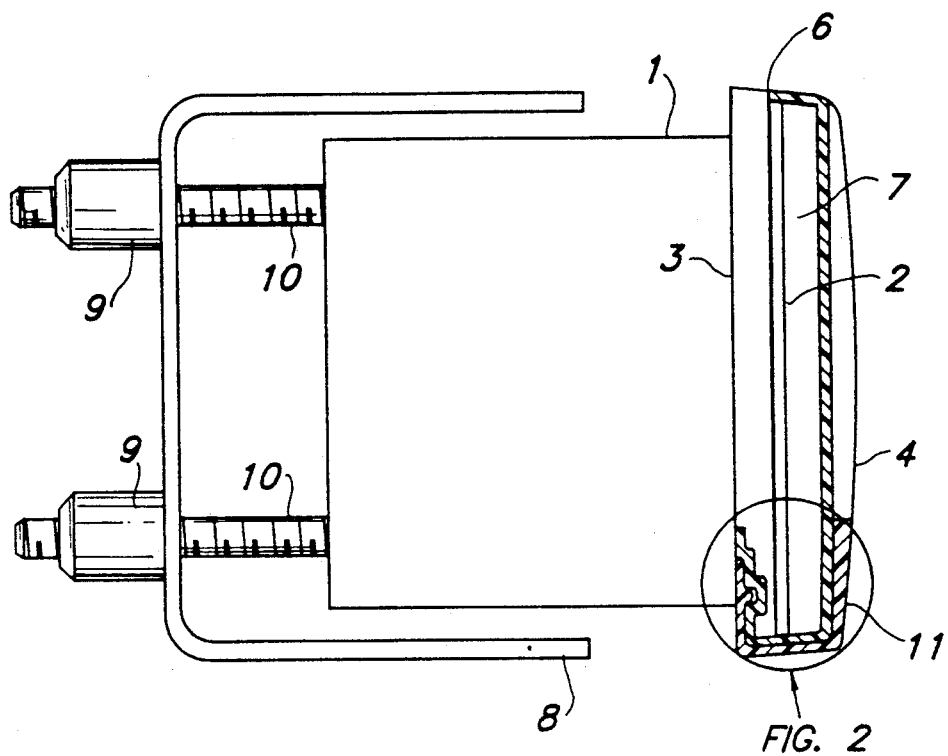
FIG. 1 is a partially sectioned side view of an inventive measuring instrument or gauge.
Figure 2:
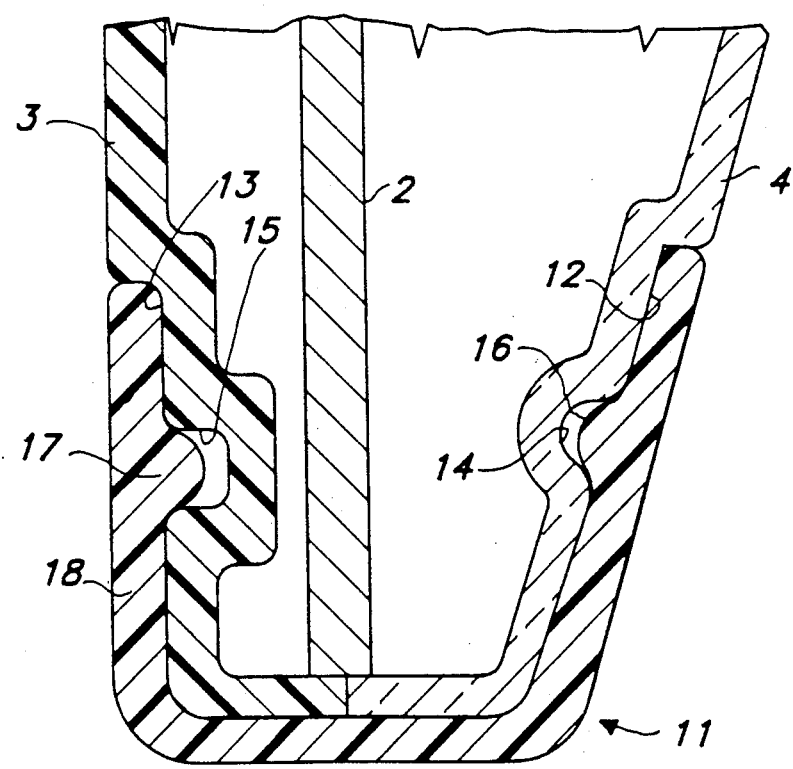
FIG. 2 is an enlarged view of the ringed are in FIG. 1.

A decoration strip or panel shown generally at 11 covers the lower part of the front plate 4. The decoration strip 11 of the illustrated embodiment is troughshaped and grips around the lower part of the front surface of the front plate 4 and the rear side of the attachment plate 3. As will best be seen from FIG. 2, the parts 12, 13 of the front plate and the attachment plate 3 overlapped by the decoration strip 11 are recessed, so that the outer surface of the decoration strip 11 is flush will surfaces adjacent thereto, so as to obtain a smooth and even transition between said surfaces.

The part 12 of the front plate 4 and the part 13 of the plate 3 are each provided with a respective groove 14 and 15. The decoration strip or panel 11 has corresponding beads 16 and 17 on its mutually opposing inner surfaces. The strip 11 is conveniently made of a springy, resilient plastics material, so as to enable mutually opposing wall sections of the strip or panel 11 to be first pressed apart and then allowed to spring back with the beads 16, 17 snapping into the grooves 14, 15, when the troughshaped decoration strip is fitted to the instrument panel by moving the strip up over the recessed parts 12, 13 of the front plate 4 and the attachment plate 3.

The described embodiment will normally suffice to hold the decoration strip 11 firmly on the instrument, particularly since the wall 18 of the strip 11 will be clamped firmly against the instrument panel when the instrument is fitted in position. If desired, the connection can be further strengthened by placing a piece of double-sided adhesive tape in the bottom of the trough of the trough-shape decoration strip.

I claim:

1. A measuring instrument comprising an instrument body (1), a dial (2), an attachment plate (3) on the instrument body behind the dial, a transparent front plate (4)

covering the dial, the front plate being permanently and water-tightly attached to at least one of said attachment plate and dial and defining a sealed spaced between the front plate and the dial, a separate detachable decoration panel (11) that covers part of the front plate and has a U-shaped cross section having legs that have profiled resilient parts (16, 17), at least one of said front plate and attachment plate having corresponding profiled parts (14, 15) which coact with said profiled panel parts to enable said decoration panel to be snap-fitted onto the instrument with said leg gripping between them said front plate and said attachment plate.

2. An instrument according to claim 1, wherein a portion of the front plate overlapped by said decoration panel is recessed such that the outer surfaces of said front plate and the adjacent said leg of said decoration panel are flush.

* * * * *